United States Patent [19]

Brooks

[11] Patent Number: 4,483,076
[45] Date of Patent: Nov. 20, 1984

[54] GROUND CONTACT AREA MEASUREMENT DEVICE

[75] Inventor: Wahner E. Brooks, Yuma, Ariz.

[73] Assignee: The United States of America as represented by the Secretary of the Army, Washington, D.C.

[21] Appl. No.: 445,405

[22] Filed: Nov. 30, 1982

[51] Int. Cl.$^3$ .............................................. G01B 7/32
[52] U.S. Cl. ...................................... 33/123; 33/1 M; 200/86 A
[58] Field of Search .................. 200/86 A, 159 B, 46, 200/86 R; 33/123, 121, 1 M; 235/99 A

[56] References Cited

U.S. PATENT DOCUMENTS

| | | | |
|---|---|---|---|
| 981,552 | 1/1911 | Gotz | 33/123 |
| 1,688,308 | 10/1928 | Harding | 33/123 |
| 2,525,824 | 10/1950 | Nagel | 235/99 A |
| 3,264,739 | 8/1966 | Berlinsky et al. | 33/123 |
| 3,470,360 | 9/1969 | Rust et al. | 200/46 X |
| 3,654,407 | 4/1972 | Kepner et al. | 200/86 R |
| 3,748,443 | 7/1973 | Kroll et al. | 33/123 X |

Primary Examiner—William D. Martin, Jr.
Attorney, Agent, or Firm—Anthony T. Lane; Robert P. Gibson; Saul Elbaum

[57] ABSTRACT

Measurement of the area and shape of contact between a vehicle's wheels or tracks and the surface over which it moves is automated by having the vehicle drive over an array of switches connected in a matrix including X and Y conductors. The matrix is systematically scanned to produce a pulse train with one pulse therein for each closed switch, with the locations of said pulses indicating the shape of the area of contact. Circuit means are provided to count the number of pulses to indicate the area of contact and to operate a small scale display which indicates the shape of the area of contact.

6 Claims, 6 Drawing Figures

GROUND CONTACT AREA MEASUREMENT DEVICE

The invention described herein may be manufactured, used, and licensed by or for the United States Government for governmental purposes without the payment to me of any royalty thereon.

BACKGROUND OF THE INVENTION

The area of contact between a moving load transfer device such as the wheels or tracks of military vehicles and the surface over which such vehicles move is often needed by design engineers for such purposes as evaluating mobility potential or for determining appropriate adjustment to the load transfer devices. For these purposes both the total area of contact as well as the shape of the contact area are needed. The total area in conjunction with the gross weight of the vehicle would yield the pressure or load per unit area which is important for example in determining whether the vehicle might safely cross a bridge of known capacity. The shape of the contact area would have a bearing on the traction to be expected from different types of ground surfaces. Also, the load per unit area is important for evaluating the rate of wear of such things as tracks and tires.

In the past, measurement of wheel and track loading on supporting structures or on the ground has been accomplished by footprint techniques wherein a print of the outline of the area of contact is made on paper laid on the ground and driven over. Planimeter type devices can then be used to measure the area of the so-called footprint. Also, automatic techniques have been developed for calculating the contact area of the footprint and digitally displaying the results. However the acquisition of the print has remained a tedious and time consuming task. Further, the inaccuracy of this technique means that several prints must be made to assure confidence in the results.

The present invention completely automates such measurements by providing an array of load sensors disposed in a matrix and arranged so that the vehicle to be tested is driven over the matrix. The pressure of the wheels and/or tracks of the vehicle will actuate a number of the load sensors. The array is scanned to determine the number and positions of the actuated load sensors and this information is used to determine the total area of contact as well as the shape thereof. Further, by adjusting the operating threshold of the load sensors, shape and area information can be determined for go-no go requirements.

SUMMARY OF THE INVENTION

An illustrative embodiment of the area measurement device may comprise an array of load sensors arranged on a platform in rows and columns. An array or matrix of conductors, one conductor for each row and column of sensors (or transducers) is provided, with each sensor located at the intersection of a conductor row and conductor column. Each transducer may comprise an electro-mechanical or piezo-electrical switch which electrically connects the orthogonal or X and Y conductors at its intersection whenever the load exceeds a certain threshold. The electro-mechanical switch may comprise a plunger of T-shaped cross section with the stem of the T passing through a central hole in a cylindrical compressable separator. When a load is applied to the plunger, it compresses the separator and makes electrical contact between the X and Y conductors at that intersection. A scanning circuit is arranged to systematically interrogate the matrix to determine which of the switches are closed and the locations thereof. A pulse train with this information therein is produced. By applying this pulse train to a pulse counter, the total area of contact can be determined from the known spacing of the transducers. Also by applying the pulse train to a display comprising a small scale model of the sensor array, the shape of the area of contact can be displayed. The small scale model display may comprise an array of lights equal to the number of sensors of the load sensor array. Circuitry is provided to illuminate each light corresponding to an actuated load sensor switch, thus the illuminated lights would show the shape of the contact area.

It is thus an object of the invention to provide a device for quickly and accurately measuring the area of contact with the ground and the shape of such areas of contact made by load transfer devices such as the wheels and tracks of vehicles.

Another object of the invention is to provide a load contact area measuring device of the type described which includes a threshold feature whereby the individual sensors will respond only to loads or pressure exceeding a design threshold.

A further object of the invention is to provide a contact area and shape measuring device comprising an array of load sensors arranged over the intersections of a matrix of orthogonal conductors, said sensors being arranged to connect said conductors when the load on said sensors exceeds a predetermined threshold, and circuitry for systematically scanning said matrix of conductors to produce a pulse train with one pulse therein for each such connected intersection, with the locations of the pulses in said train related to the locations of said connected intersections, and means to determine the total area of contact by counting the number of pulses, and means to determine the shape of said area by applying said pulse train to a small scale matrix of lights plus circuitry, said circuitry adapted to illuminate a pattern of said lights which duplicates the shape of said area.

A still further object of the invention is to provide a matrix comprising rows and columns of switches connected by orthogonal rows and columns of X and Y conductors, with one switch at each intersection of an X and Y conductor, said switches being normally open with one of the two terminals thereof connected to an X conductor and the other of said terminals to a Y conductor, means to sequentially scan said X and Y conductors to produce a pulse train with a unique time slot therein for each of said intersections, with a pulse in each said time slot representing a closed one of said switches, and means to count the number of pulses of said pulse train to determine the number of such closed switches.

A further object of the invention is to provide a pulse train with one pulse therein for each connected intersection, with the location of the pulses in said train related to the locations of said connected intersections and means to determine and display the total area of contact and shape of said area by creating an analytical replica in matrix format in a computer processor.

These and other objects and advantages of the invention will become apparent from the following detailed description and the drawings.

DETAILED DESCRIPTION OF A PREFERRED EMBODIMENT

Figure 1:
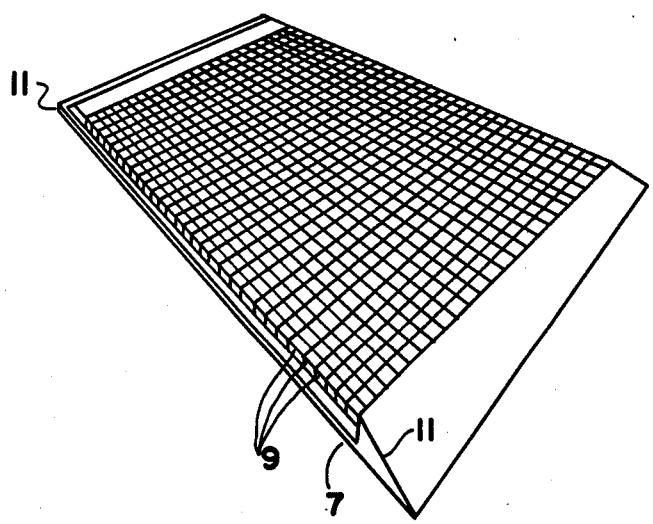
FIG. 1 is a pictorial view of the load sensor array.

In FIG. 1, a plurality of transducers or load sensors 9 are arrayed on a platform 7 which is placed on the load carrying surface which would normally be the ground. Opposite sides of the platform 7 may have ramps 11 either integral therewith or attached thereto to facilitate the driving of vehicles over the array of load sensors. The transducers 9 are arranged in rows and columns, as shown.

Figure 2:
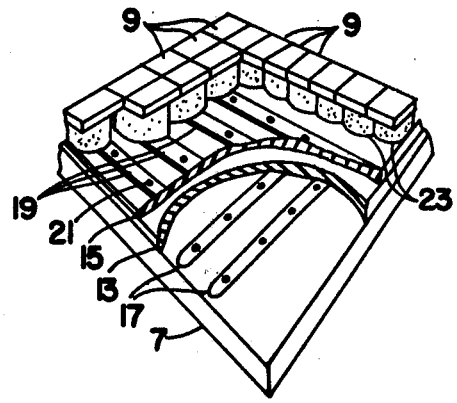
FIG. 2 is a cutaway view of a portion thereof showing some of the internal features thereof.

In the cutaway view of FIG. 2, the orthogonal arrays of conductors forming a part of the transducers can be seen. The transducers in this embodiment comprise T-shaped mechanical plungers, the tops or cross members of which are shown in FIGS. 1 and 2. Beneath each row of plungers is a conductor 17, each attached to the top of the platform 7. The platform is made of insulated material of the proper strength to support the loads anticipated. An insulating spacer 13 is bonded to the upper surface of the platform 7 and the array of conductors 17. Above the spacer 13 is another insulating spacer 15 which has a second array of conductors 19 embedded therein, all of the conductors 19 running along a column of transducers. The second array of conductors are thus at right angles or orthogonal to those of first array. Each of the conductors 19 have holes therein such as 21, through which the stems 25 of the T-shaped plungers pass. FIG. 2 also shows the compressable separators 23 which form a part of each of the transducers or load sensors.

Figure 3:
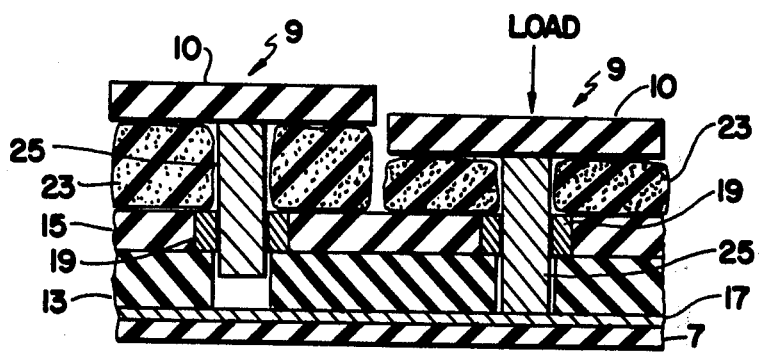
FIG. 3 is a vertical cross section of the structure of FIGS. 1 and 2 illustrating other features thereof.

The vertical cross sectional view of the load sensor array of FIG. 3 is taken along a vertical plane running through and parallel to one of the conductors 17 and thus perpendicular to the other array of conductors 19. Two transducers are shown, the right one being compressed and actuated by load applied from above. The compressable separators are formed of a suitable compressable, nonconductive material such as rubber and are bonded to the upper surface of spacer 13 to aid in keeping the transducer plungers aligned. The separators 23 can be cylindrical with central holes to accommodate the stems of the plungers. The plunger stems 25 are of metal and hence conductive while the tops or cross members thereof, 10, are insulated or nonconductive, to prevent short circuiting of adjacent plungers by such things as metallic vehicle tracks. As can be seen the plunger stems 25 all pass through the holes 21 in the upper array of conductors, 19, and thus each plunger stem makes contact with one of these conductors. If a plunger is depressed sufficiently, the lower end of the metallic stem thereof will come to rest against the conductor 17 which happens to be below it, thus making electrical contact between the conductors at that intersection. The strength or compliance of the separators 23 is selected so that a predetermined load will be necessary to actuate the transducers. Thus it can be arranged that light loads such as walking humans or animals will not actuate the transducers.

The two arrays of conductors 17 and 19 thus form a matrix which electrically comprises an array of X and Y orthogonally disposed conductors with each plunger forming a switch at each intersection of said matrix. The switches are normally open but when actuated by a load more than the predetermined threshold will close to electrically connect the X and Y conductors at that intersection. A circuit diagram of such a matrix is shown at 43 in FIG. 4 which for clarity has only sixteen intersections formed by two orthogonal arrays of four conductors each. The horizontal conductors are labelled X1 through X4. The load sensors or transducers at each intersection are shown as single pole, single throw switches connecting the X and Y conductors or lines at the intersections. Thus switch 1-1 represents the intersection of conductor X1 and Y1 and 2-3 the intersection of conductors X2 and Y3. As shown, all of the switches of this matrix are open except the four switches 2-2, 2-3, 3-2 and 3-3 in the center thereof. It is assumed that these are closed because of a load on these transducers.

Figure 4:
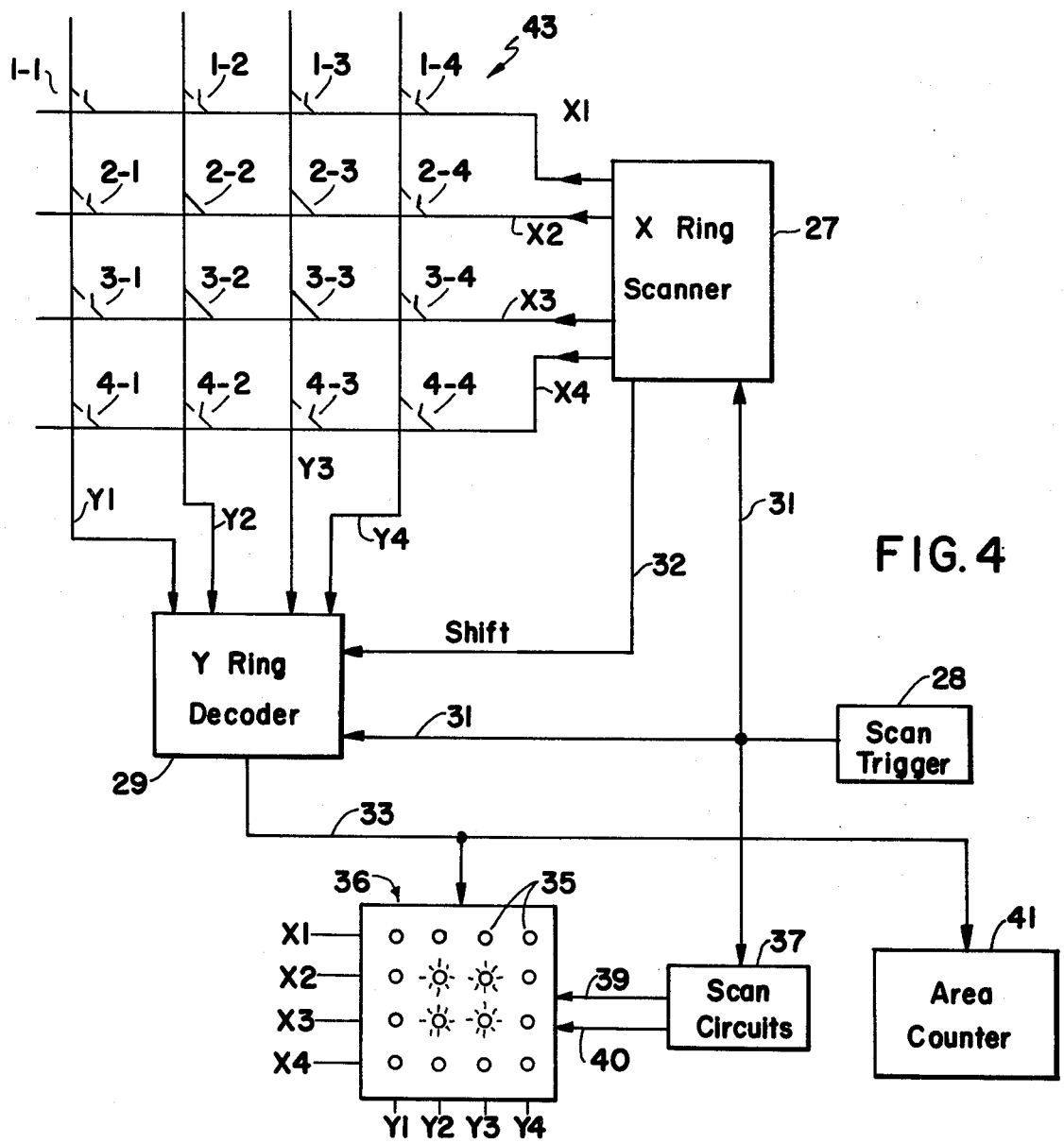
FIG. 4 shows how the load sensor array is scanned, the area determined, and the shape thereof remotely displayed on a scale model array of lights.

The circuitry for interrogating the matrix of FIG. 4 includes an X ring scanner 27, a Y decoder 29 and scan trigger 28. Both the X ring scanner and the Y ring decoder comprise ring type circuits with a number of stages equal to the number of conductors or lines to be scanned, in this case four for each of these circuits. The X scanner 27 sequentially applies a pulse to each of the X conductors. These X conductor pulses are made long enough so that the Y decoder can scan all four of the Y conductors during each X conductor pulse. Thus the first scanner pulse may be applied to line X1 and during this pulse the Y decoder will scan each of its lines Y1 through Y4 in sequence. The X scanner then shifts its output to line X2 and the process is repeated. If an intersection switch is closed, the Y decoder will pick up the X pulse at that intersection through the closed switch, and produce a pulse on its output lead 33 in that time slot. A pulse applied to the scanning and decoding circuits 27 and 29 on leads 31 from scan trigger 28 initiates and synchronizes the operation thereof. Also a shift pulse from scanner 27 to decoder 29 on lead 32 also aids in the synchronization of these circuits.

Figure 6:
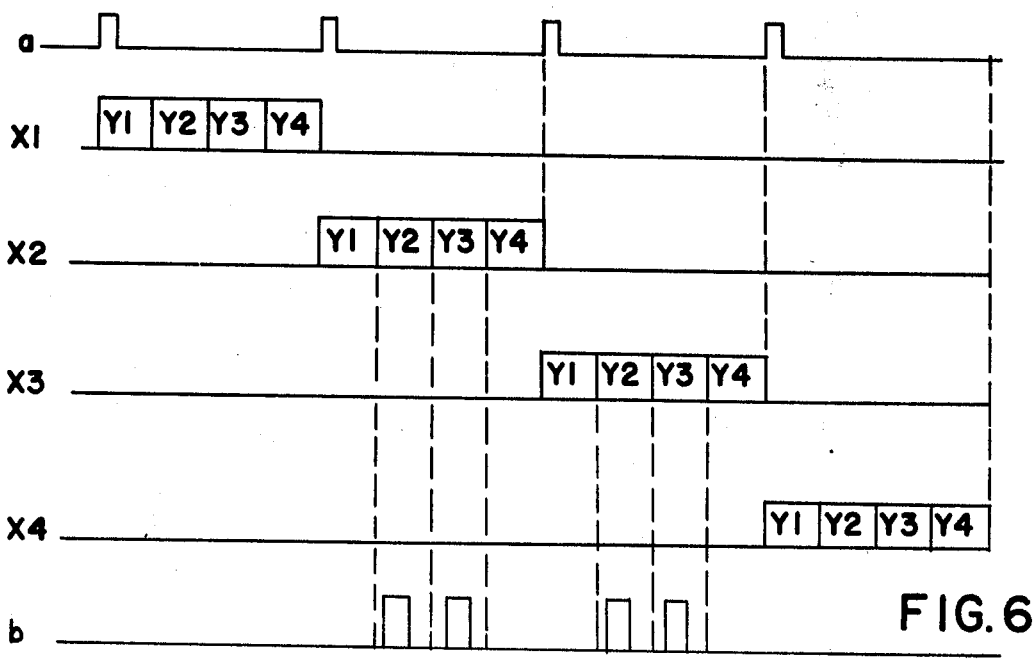
FIG. 6 illustrates waveforms resulting from the operation of the circuits of FIGS. 4 and 5.
Figure 5:
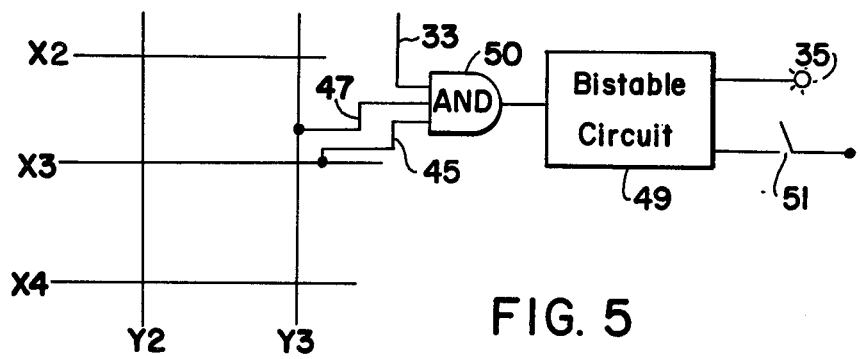
FIG. 5 shows details of the circuits of the light display of FIG. 4.

The interrogation of the matrix 43 is illustrated by the waveforms of FIG. 6, in which waveform "a" is the pulse output of scan trigger 28. The waveforms X1–X4 represent the pulses sequentially applied to these X lines by scanner 27, with the scanning of the Y lines, Y1–Y4, indicated within each pulse produced by the X scanner. It can be seen that this arrangement results in a systematic scanning of each intersection of the matrix starting with the upper left or 1-1 intersection and ending at the lower right or 4-4 intersection. Waveform "b" represents the pulse train on the lead 33 which is the output of Y decoder 29. With the pattern of opened and closed switches shown in FIG. 4, the pulse train will include four pulses representing the four closed switches, 2-2, 2-3, 3-2 and 3-3. Further, the location or timing of these pulses with respect to the known scanning pattern is an indication of the location of the closed switches and hence also of the shape of the area of contact. FIG. 4 includes circuitry for displaying this information. This circuitry includes an area counter 41 to which the pulse train on lead 33 is applied. This counter merely counts the number of such pulses in each full scan of the matrix 43 and is calibrated to indicate the total area represented thereby. The pulse train on lead 33 is also applied to a display matrix 36 which comprises a small scale model of the matrix 43 with a light 35 at each of its sixteen intersections. The display matrix is scanned by means of scan circuits 37 in synchronism with the scanning of the main matrix 43 and trigger pulses from scan trigger circuit 28 accomplishes this synchronization. The scan circuit 37 includes means to scan both the X and Y lines of display matrix 36 through leads 39 and 40. Each of the intersections of the display matrix is provided with circuitry such as that of FIG. 5, which illustrates the intersection X3 and Y3, or 3-3. A three-input AND gate 50 has one input 45 connected to the X line and another input 47 connected to the Y line. The third input thereof is the lead 33 from decoder 29. While the scan circuits 37 are interrogating or scanning this intersection both the X and Y lines thereof will be energized and if the corresponding intersection of main matrix 43 is closed, a pulse will be present on lead 33. Thus, the AND gate will be enabled and a pulse passed to bistable circuit 49. Circuit 49 may be a multivibrator type circuit which is normally reset by means of switch 51 and is adapted to be switched to the set condition by a pulse from the gate 50. The light 35 is arranged to be illuminated whenever the circuit 49 is in the set condition. Thus all of the lights 35 of display matrix 36 will go on and stay on until reset to indicate the shape of the area of contact.

Rather than having separate scanning circuitry 37, the display matrix may be driven in parallel with the main matrix 43 by scanner 27 and decoder 29. This might be expedient if the two matrices were located close together.

I wish it to be understood that I do not desire to be limited to the exact details of construction and circuitry shown and described, for obvious modifications can be made by a person skilled in the art.

I claim:

1. An area measurement and display device comprising a main matrix of switches arranged in rows and columns and adapted to be driven over by a vehicle to be tested, means to systematically scan said main matrix to produce a pulse train having one pulse therein for each of said switches which is closed by the load of said vehicle, means to apply said pulse train to a pulse counter which is calibrated to indicate the area of contact of said vehicle with said main matrix, a display matrix comprising a scale model of said main matrix, said display matrix having an array of lights duplicating the number and location of the switches of said main matrix, means to scan said display matrix in synchronism with said main matrix, and circuit means responsive to said pulse train to illuminate the lights of said display matrix which correspond to the closed switches of said main matrix.

2. The device of claim 1 wherein said circuit means comprises bistable circuits for operating each light of said display matrix and means responsive to the pulses of said pulse train and the scanning of the X and Y lines of said display matrix to set said bistable circuit and thus illuminate the light connected thereto.

3. A contact area and shape measuring device comprising:
   a main matrix of switches arranged in rows and columns and adapted to be driven over by a vehicle to be tested, including
      an array of first laterally spaced parallel conductors,
      an array of second laterally spaced parallel conductors, each second conductor being vertically spaced from and crossing said first conductors at respective intersections of the second conductor and the first conductors, and an array of load sensors arranged respectively over the intersections of said first and second conductors, each load sensor being arranged to connect the first conductor and the second conductor at the adjacent intersection when the load on the load sensor exceeds a predetermined threshold;
   main matrix scanning means for systematically scanning said main matrix to produce a pulse train having one pulse therein for each of said switches which is closed by the load of said vehicle;
   a pulse counter which is connected to receive said pulse train and which is calibrated to indicate the area of contact of said vehicle with said main matrix;
   a display matrix comprising a scale model of said main matrix, said display matrix including an array of indicating devices duplicating the number and location of the switches of said main matrix;
   display matrix scanning means for scanning said display matrix in synchronism with said main matrix; and
   actuating means, responsive to said pulse train, for actuating the indicating devices of said display matrix which correspond to the closed switches of said matrix.

4. The device of claim 3, in which each of said load sensors comprises:
   a T-shaped mechanical plunger with a non-conductive top or cross member and a conductive stem, said stem projecting through a hole in one conductor of one of said arrays of conductors and making contact therewith; and
   compressable material normally holding said plunger stem away from the intersecting conductor of the other of said arrays of conductors, whereby a load applied to the top of said plunger in excess of said threshold will result in electrical contact between the first and second conductors at said intersection.

5. The device of claim 3, wherein said indicating devices of said display matrix are lights.

6. The device of claim 5 wherein said display matrix comprises arrays of X and Y conductors corresponding to and disposed in the same manner as said arrays of first and second conductors, respectively, of the main matrix, and wherein each intersection of said display matrix has connected thereto a three-input AND gate and a bistable circuit connected to one of said lights, the inputs of said AND gate being the X and Y conductors of that intersection plus said pulse train.

* * * * *